United States Patent

[11] 3,622,961

[72] Inventor Alexander C. Vasiloff
    Old Lyme, Conn.
[21] Appl. No. 3,127
[22] Filed Jan. 15, 1970
[45] Patented Nov. 23, 1971
[73] Assignee The United States of America as represented by the Secretary of the Navy

[54] AUTOMATIC SONAR-BEAM-PATTERN PLOT
    1 Claim, 1 Drawing Fig.
[52] U.S. Cl. .................................................. 340/5 C,
                                                         340/6 R
[51] Int. Cl. .................................................. G01s 3/00
[50] Field of Search .......................................... 340/3 R, 5,
                                              5 C, 6, 8; 343/100 AP

[56] References Cited
    UNITED STATES PATENTS
3,292,139 12/1966 Einstein et al. ............... 340/5 C
2,999,225 9/1961 Gregg, Jr. et al. .............. 340/8

Primary Examiner—Richard A. Farley
Attorneys—Richard S. Sciascia, Louis B. Applebaum and Philip Schneider ABSTRACT: Means for making a polar plot of the beam pattern of a sonar transducer array. A sonar transmitting transducer is suspended from a long boom aboard a ship. A synchro transmitter is attached to the swivel point of the boom and electrically connected to a synchro receiver which rotates the polar-plot paper of a pen recorder. The input to the pen of the recorder is the output signal of the receiving sonar equipment on the ship, the beam pattern of the sonar equipment's receiving-transducer array being automatically recorded as the boom (and therefore the transmitting transducer) is rotated from port to starboard.

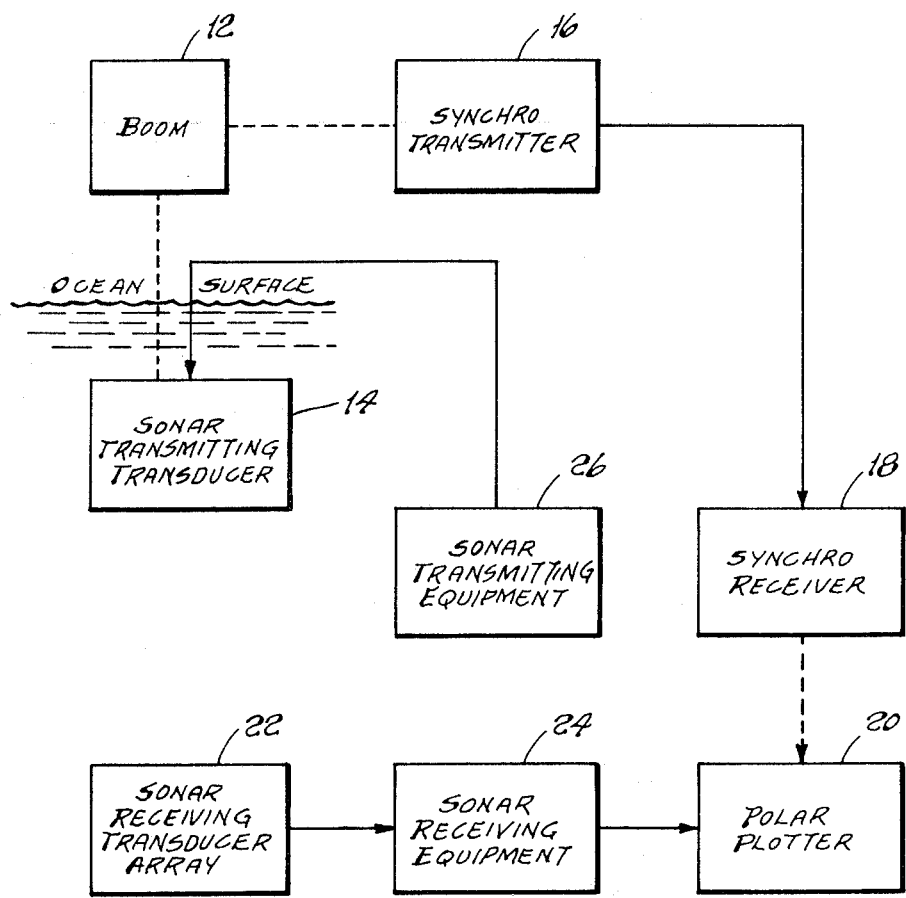

AUTOMATIC SONAR-BEAM-PATTERN PLOT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonar beam pattern measurements and especially to an improved means for automatically obtaining a polar pattern for a sonar transducer array.

The present method for obtaining beam amplitude versus azimuth angle for sonar receiving transducer arrays is a long, tedious job. A sound source is suspended from a long boom on the ship and sound level meter readings from the test set are recorded for each of the preformed beams (e.g., the SQR–13 sonar set has 18 preformed beams) at one degree increments. The boom is moved manually and anchored to the lifeline stanchion by means of two ½-inch lines attached to the boom. The azimuth of the boom is measured visually with a transit.

The lines used to anchor the boom stretch while positioning the boom; jockeying the boom and retying the lines consumes an inordinate amount of time. An average of only four boom positions per hour is possible when using this method. Complete beam-pattern measurements of the forward dome (over approximately 300°) take about 75 hours.

The mid-dome measurements are further complicated by the fact that the swivel point of the boom does not coincide with the center of the dome because of the superstructure of the ship. The swivel points for the mid-dome are located on the port and starboard sides of the bridge superstructure and in each position, the swing of the boom is 180°. Assuming that an hour is spent to measure 4°, 45 hours will be required for each side, thereby requiring a total of about 165 hours to obtain all data for beam-pattern measurement.

STATEMENT OF THE OBJECTS OF THE INVENTION

An object of this invention is to increase the speed and ease with which polar beam patterns of sonar transducer arrays can be made.

This and other objects and advantages are accomplished by suspending a sonar transmitting transducer from a boom aboard a ship and attaching a synchro transmitter to the boom so that both rotate together. The synchro receiver rotates the polar-plot paper of a pen recorder whose input is the output of the sonar receiving equipment aboard the ship.

Other objects, advantages and novel features of the invention will become apparent from the following detailed description of the invention when considered in conjunction with the accompanying drawings wherein:

BRIEF DESCRIPTION OF THE DRAWING

The single FIGURE is a block diagram of the invention.

DESCRIPTION OF THE PREFERRED EMBODIMENT

A long boom 12 is mounted to swivel about a king post aboard a ship carrying a sonar set having a receiving transducer array with a number of preformed beams, e.g., 18 preformed beams. A sonar transmitting transducer 14 is hung from the end of the boom 12 so that the transducer 14 lies under the ocean surface. The transmitting transducer 14 may be fed from sonar transmitting equipment 26 aboard the ship.

A syncrho transmitter 16 is mounted on the swivel point of the boom 12 and is electrically connected to a synchro receiver 18 which is, in turn, mechanically connected to a polar plotter 20. The latter is a pen recorder using polar plotting paper which is rotated by the synchro receiver 18. (The polar plotter may, for example, be the Bruel and Kjaer Model 2305, "Graphic Level Recorder.")

In operation, the sonar receiving set is switched on and a single beam is selected by means of its beam selector switch. The boom 12 is swung to port and signals are emitted by the sonar transmitting transducer 14. These signals are received by the receiving transducer array 22 and processed by the sonar receiving equipment 24. The output of the latter is a signal level which is fed to the pen of the polar plotter 20 which records it on the polar paper at the correct angle. Other signal levels are recorded on the paper at the proper angle as the boom 12 rotates from port to starboard. A polar plot of signal level versus azimuth angle is thus automatically produced by the equipment.

Alignment of the equipment is very simple. A protractor is mounted on the king post and is oriented for 0° on the ship's fore-and-aft center line. With the axis of the boom along this line, the polar paper's 0° line is placed directly under the pen point. This completes the alignment procedure.

Obviously many modifications and variations of the present invention are possible in the light of the above teachings. It is therefore to be understood that within the scope of the appended claims the invention may be practiced otherwise than as specifically described.

I claim:

1. In combination with sonar transmitting equipment,
   sonar receiving equipment having a receiving transducer array which forms at least one beam, said equipment being located nonrotatably aboard a ship, and automatic beam pattern measurement apparatus comprising:
   swiveling boom means one end of which extends beyond the sides and bow of said ship;
   sonar transmitting transducer means attached to said one end of said boom so that the transducer means lies in the water;
   synchro transmitter means coupled for rotation with said swiveling boom means so that there is a one-to-one correspondence between the angular positions of said boom means and said synchro transmitter means;
   polar plotter means connected to receive and record the output signal of said sonar receiving equipment on polar-plot paper; and
   synchro receiver means connected to said synchro transmitter means for rotation in synchronism therewith and mechanically coupled to said polar plotter to rotate said polar-plot paper.

* * * * *